United States Patent
Dubin et al.

(10) Patent No.: US 8,559,988 B2
(45) Date of Patent: *Oct. 15, 2013

(54) SYSTEM AND METHOD FOR SUBSCRIPTION MANAGEMENT

(75) Inventors: Garth R. Dubin, Lovettsville, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,829

(22) Filed: Oct. 24, 2011

(65) Prior Publication Data

US 2012/0052890 A1 Mar. 1, 2012

Related U.S. Application Data

(63) Continuation of application No. 11/711,732, filed on Feb. 28, 2007, now Pat. No. 8,046,010.

(60) Provisional application No. 60/779,431, filed on Mar. 7, 2006.

(51) Int. Cl.
*H04W 4/00* (2009.01)

(52) U.S. Cl.
USPC ...................................................... 455/466

(58) Field of Classification Search
USPC ............ 455/466, 550.1, 432.1, 407; 370/352; 705/21, 26.1, 14.38; 379/88.13, 221.08
See application file for complete search history.

(56) References Cited

U.S. PATENT DOCUMENTS

| | | | |
|---|---|---|---|
| 6,185,289 B1 * | 2/2001 | Hetz et al. | 379/221.08 |
| 6,910,628 B1 | 6/2005 | Sehr | |
| 7,110,950 B2 | 9/2006 | Basso et al. | |
| 7,110,954 B2 | 9/2006 | Yung et al. | |
| 7,664,885 B2 | 2/2010 | Carapelli | |
| 7,801,171 B2 | 9/2010 | Skoczkowski et al. | |
| 7,925,283 B2 * | 4/2011 | Smith et al. | 455/466 |
| 2002/0147658 A1 | 10/2002 | Kwan | |
| 2005/0105513 A1 * | 5/2005 | Sullivan et al. | 370/352 |
| 2005/0197885 A1 * | 9/2005 | Tam et al. | 705/10 |
| 2005/0246193 A1 | 11/2005 | Roever et al. | |
| 2005/0249172 A1 | 11/2005 | Malik | |
| 2006/0006226 A1 | 1/2006 | Fitzgerald et al. | |
| 2006/0106679 A1 | 5/2006 | Rosenhaft et al. | |
| 2006/0149644 A1 | 7/2006 | Sulmar et al. | |
| 2007/0125104 A1 | 6/2007 | Ehlers | |
| 2007/0213079 A1 | 9/2007 | Dubin et al. | |
| 2008/0108333 A1 | 5/2008 | Jemison et al. | |
| 2008/0114884 A1 | 5/2008 | Hewes et al. | |
| 2009/0100523 A1 * | 4/2009 | Harris | 726/26 |

* cited by examiner

*Primary Examiner* — Kiet Doan

(74) *Attorney, Agent, or Firm* — Edell, Shapiro & Finnan, LLC

(57) ABSTRACT

A subscription manager module or message processing engine operating within a messaging inter-carrier vendor (MICV) provides value added services to both service users (e.g., mobile telephone users) and service providers (e.g., information brokers, vendors, news sources, etc.). The MICV is disposed between a plurality of service users and a plurality of service providers and messages sent between these parties are processed by a subscription manager module, or message processing engine, which is configured to, among other things, manage short codes, detect undesirable spam messages, operate service user opt-in and opt-out processes, and perform billing functions.

18 Claims, 2 Drawing Sheets

SYSTEM AND METHOD FOR SUBSCRIPTION MANAGEMENT

This application is a continuation of application Ser. No. 11/711,732 filed Feb. 28, 2007, which claims the benefit of U.S. Provisional Application No. 60/779,431, filed Mar. 7, 2006, the entireties of which are incorporated herein by reference.

BACKGROUND

1. Field of the Invention

The present invention relates generally to telecommunications services. More particularly, the present invention relates to capabilities that augment the user experience surrounding, and otherwise enhance the value and usefulness of, various wireless messaging paradigms including, inter alia, Short Message Service (SMS) and Multimedia Message Service (MMS).

2. Background of the Invention

As the 'wireless revolution' continues to march forward the ability of a Service User (SU), for example a user of a wireless device such as a cellular telephone, to manage or control, within a truly ubiquitous cross-carrier environment, the messaging activity with which they wish to participate has grown increasingly more challenging and, as a consequence, substantially in importance.

The present invention, a Subscription Manager (SM) capability, facilitates aspects of such management or control. A SM may operate within a centrally-located, full-featured Messaging Inter-Carrier Vendor (MICV) facility. Alternatively, a SM may operate within the environment of a Wireless Carrier (WC), or within the environment of a Service Provider (SP), or within the environment of some other entity. While the discussion below will center on a MICV-based SM it will be readily apparent to one of ordinary skill in the relevant art that other placements are equally applicable and indeed are fully within the scope of the present invention.

A SM allows a SU to efficiently engage in activities or exchanges (including, possibly among other things, the acquisition of information, the receipt of services, the purchase of products, etc.) with one or more SPs by addressing various of the structural impediments that naturally arise under such a model. Various of the structural impediments include:

1) Limited Resources. A SP may employ a Short Code (SC) as the address to which it would ask users of its service to direct their request messages. While the abbreviated length of a SC (e.g., five digits for a SC administered by Neustar under the Common Short Code [CSC] program) incrementally enhances the experience of a SU (e.g., the SU need remember and enter only a few digits as the destination address of their request message) it also, by definition, constrains the universe of available SCs thereby causing each individual SC to be a limited or scarce resource. A description of a common (i.e., universal) short code environment may be found in pending U.S. patent application Ser. No. 10/742,764 entitled "UNIVERSAL SHORT CODE ADMINISTRATION FACILITY."

2) Spam. Under normal circumstances unsolicited or undesired messages may be a nuisance to a SU. If those messages also entail a WC per-message delivery charge then they can become significantly more than just an annoyance.

3) Opt-In/Opt-Out. The procedures surrounding the, in some cases legally-mandated, ability of a SU to opt-in and/or opt-out of, for example, an SP's offering through a single/double/etc.—step process.

4) Billing. The need to flexibly and dynamically perform a range of billing activities (including, possibly among other things, tasks such as price determination, billing transaction, etc.) represent a substantial challenge.

SUMMARY OF THE INVENTION

Embodiments of the present invention provide mechanisms by which a messaging inter-carrier vendor (MICV) provides value added services to both service users (e.g., mobile telephone users) and service providers (e.g., information brokers, vendors, news sources, etc.).

In an embodiment of the invention the MICV is disposed between a plurality of service users and a plurality of service providers and messages sent between these parties are processed by a subscription manager module, or message processing engine. The subscription manager is configured to, among other things, manage short codes, detect undesirable spam messages, operate service user opt-in and opt-out processes, and perform billing functions.

The subscription manager is preferably operable with a service user alone, a service provider alone, and in combination with both the service user and service provider to thereby provide appropriate services to each party depending on the particular circumstances.

These and other features of the embodiments of the present invention along with their attendant advantages will be more fully appreciated upon a reading of the following detailed description in conjunction with the associated drawings.

DETAILED DESCRIPTION OF THE INVENTION

Figure 1:
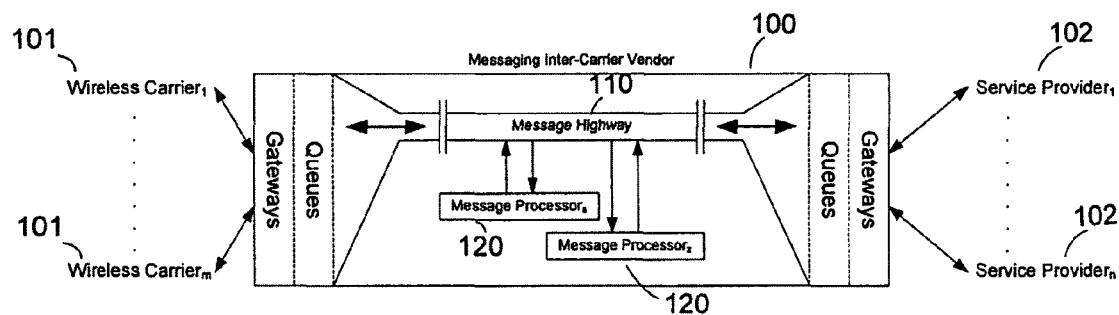
FIG. 1 is a diagrammatic presentation of an exemplary MICV.

To better understand the particulars of the present invention consider for a moment the exemplary MICV 100 that is depicted (albeit only partially, at a high-level, and from a logical perspective) in FIG. 1. The illustrated MICV 100 is disposed between multiple WCs (e.g., WirelessCarrier$_1$→WirelessCarrier$_m$) 101 on one side and multiple SPs (e.g., ServiceProvider$_1$→ServiceProvider$_n$) 102 on the other side and is, in effect, a horizontally and vertically scalable 'hub.' Among other things, a MICV facilitates the ubiquitous exchange of messaging traffic (including, inter alia, SMS messages, MMS messages, etc.) between various messaging participants. Messaging participants may include, inter alia, numerous WCs (e.g., WirelessCarrier$_1$→WirelessCarrier$_m$ in FIG. 1), numerous SPs (e.g., ServiceProvider$_1$→ServiceProvider$_n$ in FIG. 1), and others as well.

As noted above the use of a MICV, although not required, provides significant advantages. Reference is made to U.S. Pat. No. 7,154,901 entitled "AN INTERMEDIARY NETWORK SYSTEM AND METHOD FOR FACILITATING MESSAGE EXCHANGE BETWEEN WIRELESS NETWORKS," for a description of a MICV, a summary of various of the services/functions/etc. that are performed by a MICV, and a discussion of the numerous advantages that arise from same. The subject matter of this patent is incorporated herein by reference.

One of a MICV's internal components that is depicted in FIG. 1 is a Message Highway (MH) 110. At a high level, and from a logical perspective as opposed to a physical/implementation perspective, one or more MHs 110 span a MICV 100 and provide a flexible and easily extensible framework that supports, inter alia, all of the internal activities of a MICV 100 including the processing, routing, delivery, etc. of messages.

As depicted in FIG. 1 multiple Message Processors (MPs) 120, identified as Message Processor$_a$→Message Processor$_z$ in the diagram, may be 'plugged into' a MH 110. Through flexible, extensible, and easily updatable workflow chains MPs 120 may perform the full range of functions or services that are necessary to support the processing, routing, delivery, etc. of messages. The functions or services may include, inter alia, message formatting, (numbering plan, routing, etc.) lookup operations, message routing, message conversion, etc.

Through a MICV's administrative framework MPs 120 may be quickly and easily created, configured, 'attached' to a MH 110, managed (e.g., started, quiesced and stopped, reported on, refreshed, etc.), 'detached' from a MH 110, and (if and as appropriate) destroyed.

To further illustrate matters, consider several hypothetical MPs 120. In one MP 120 the workflow chain might be defined to retrieve from a message the value or the content of various of the fields of the message (perhaps Source Address [e.g., a SC, a Telephone Number (TN), etc.], Destination Address [e.g., a SC, a TN, etc.], Body, etc.) and apply to the retrieved field values a configurable set of edit or validation operations. In another MP 120 the workflow chain might be defined to apply to the retrieved field values a configurable set of formatting operations (e.g., to normalize language or encoding schemes, etc.). In yet another MP 120 the workflow chain might be defined to query a comprehensive routing repository for a message's Source Address and/or the Destination Address to authoritatively determine WC ownership/assignment information so that subsequent message routing operations properly consider worldwide initiatives such as Mobile Number Portability (MNP).

A SM 200 is an example of one particular type of value-add MP.

Figure 2:
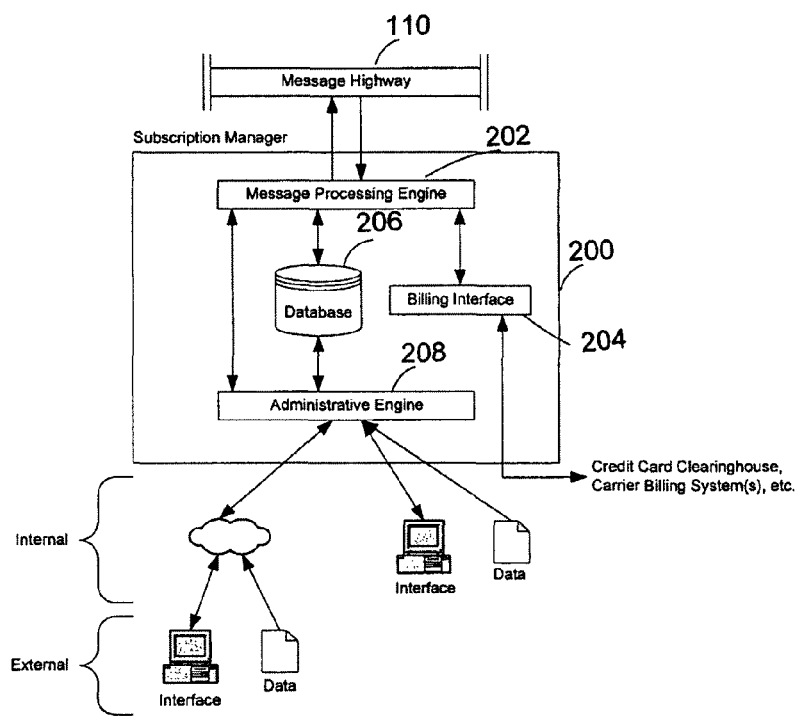
FIG. 2 is a diagrammatic presentation of an exemplary SM.

For purposes of illustration, a hypothetical SM 200 is depicted (albeit only partially, at a high-level, and from a logical perspective) in FIG. 2. The illustrated SM 200 contains several key components—a MPE 202, a Billing Interface (BI) 204, a Database (Db) repository 206, and an Administrative Engine (AE) 208. It will be readily apparent to one of ordinary skill in the relevant art that numerous other components are possible within a SM.

An MPE is a flexible, extensible, and dynamically configurable workflow-based message processing facility that will be described more fully below.

A BI provides a single, consolidated interface that a MPE may use to easily reach, inter alia, a credit card clearinghouse, a carrier billing system, a service bureau that provides access to multiple carrier billing systems, etc.

An AE provides a flexible and extensible framework that supports comprehensive administration and management capabilities. Through an AE authorized external entities (e.g., WC representatives, etc.) and authorized internal individuals (e.g., system administrators, etc.) may fully and completely administer or manage a SM and all of the different components of a SM. Possible administration/management activities include, inter alia, configuration (listing of, additions to, changes or updates to, etc.), operational status (starting, quiescing, stopping, refreshing configuration, etc.), reporting (present state, accumulated statistics, etc.). While an interface (e.g., possibly a Web-based facility) and a data exchange (e.g., possibly of XML-based documents) are illustrated in FIG. 2, it will be readily apparent to one of ordinary skill in the relevant art that numerous other access mechanisms are possible.

An AE may employ an XML paradigm for a portion of its administration and management capabilities. Under such an approach an XML document similar to:

```
<SMAEAction>
    <Type>STATUS</Type>
    .
    parameters, arguments, etc.
    .
</SMAEAction>
``` might be utilized. Note that in the above XML document 'STATUS' is a particular administration or management action and that other actions such as, inter alia, 'REPORT,' 'QUERY,' etc. are possible. The above XML document is illustrative only and it will be readily apparent to one of ordinary skill in the relevant art that numerous other paradigms, structures, etc. are possible.

The Db repository 206 that is depicted in FIG. 2 is a logical representation of the possibly multiple physical repositories that may be implemented to support, inter alia, configuration information and transaction information. The physical repositories may be implemented through any combination of conventional Relational Database Management Systems (RDBMSs) such as Oracle, through Object Database Management Systems (ODBMSs), through in-memory Database Management Systems (DBMSs), or through any other equivalent facilities.

Modular, flexible, easily extensible, and dynamically updateable configuration information (for a SM as well as for each of the different components within a SM) is housed in the configuration portion of the Db repository. The configuration information may be administered through the AE (through which a comprehensive audit trail of access, changes, etc. is maintained). The configuration information is available for 'use' by the different components within a SM, including, for example, a MPE (to, for example, instruct a MPE as to all manner of its operation including the number of internal threads that it should launch, the processing or throttling rates that it should employ, etc.)

Comprehensive Message Detail Records (MDRs) representing in-flight as well as completed (e.g., SU←→SP) message exchanges are housed in the transaction portion of the Db repository.

The information that is maintained in a Db repository may be used to support a range of real-time and/or off-line reporting capabilities. The information may be combined with other internal data (e.g., perhaps SU definition and/or transaction information as supplied by, inter alia, WCs, SPs, etc.) and/or other external data (e.g., perhaps demographic, psychographic, etc. information from various third-party firms) to yield enhanced value-add reporting.

Figure 3:
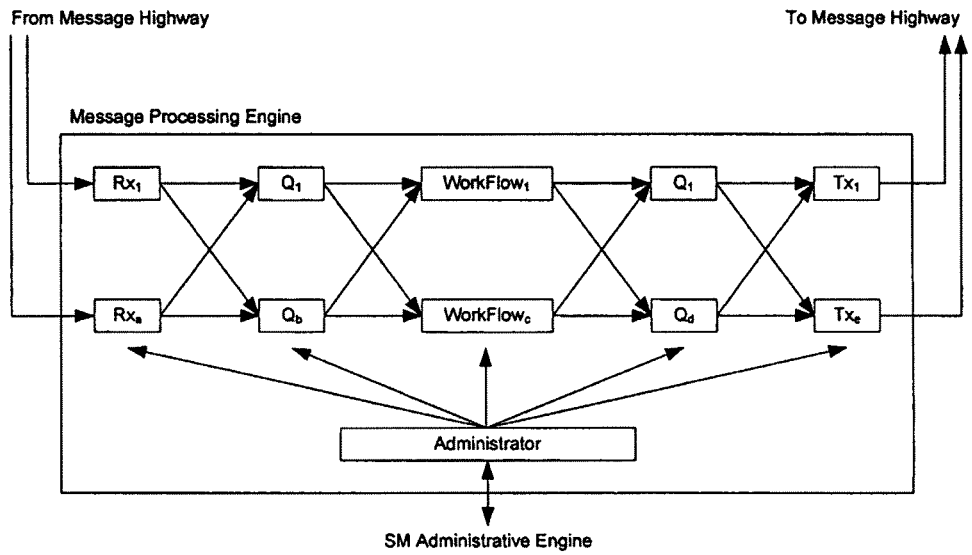
FIG. 3 depicts an exemplary SM Message Processing Engine (MPE).

For purposes of illustration, a hypothetical MPE is depicted (albeit only partially, at a high-level, and from a logical perspective) in FIG. 3. The illustrated MPE contains several key components—Receivers ($Rx_1$→$Rx_a$ in the diagram), Queues ($Q_1$→$Q_b$ and $Q_1$→$Q_d$ in the diagram), Work- Flows (WorkFlow$_1$→WorkFlow$_c$ in the diagram), Transmitters (Tx$_1$→Tx$_e$ in the diagram), and an Administrator. It will be readily apparent to one of ordinary skill in the relevant art that numerous other components are possible within a MPE.

A dynamically updateable set of one or more Receivers (Rx$_1$→Rx$_a$ in the diagram) 'get' messages from a MICV MH and deposit them on an intermediate or temporary Queue (Q$_1$→Q$_b$ in the diagram) for subsequent processing.

A dynamically updateable set of one or more Queues (Q$_1$→Q$_b$ and Q$_1$→Q$_d$ in the diagram) operate as intermediate or temporary buffers for incoming and outgoing messages.

A dynamically updateable set of one or more WorkFlows (WorkFlow$_1$→WorkFlow$_c$ in the diagram) remove incoming messages from an intermediate or temporary Queue (Q$_1$→Q$_b$ in the diagram), perform all of the required operations on the messages, and deposit the processed messages on an intermediate or temporary Queue (Q$_1$→Q$_d$ in the diagram). The WorkFlow component will be described more fully below.

A dynamically updateable set of one or more Transmitters (Tx$_1$→Tx$_e$ in the diagram) remove processed messages from an intermediate or temporary Queue (Q$_1$→Q$_d$ in the diagram) and 'put' the messages on a MICV MH.

An Administrator provides a linkage between a SM's AE and all of the different components of a MPE so that a MPE, along with all of the different components of a MPE, may be fully and completely administered or managed.

Through flexible, extensible, and dynamically updatable configuration information a WorkFlow component may be quickly and easily realized to support any number of activities. For purposes of illustration consider each of the activities (Set 1, Set 2, ... Set 5) that are depicted in FIG. 4 (these activities are illustrative only and it will be readily apparent to one of ordinary skill in the relevant art that numerous other activities are easily possible).

Figure 4:
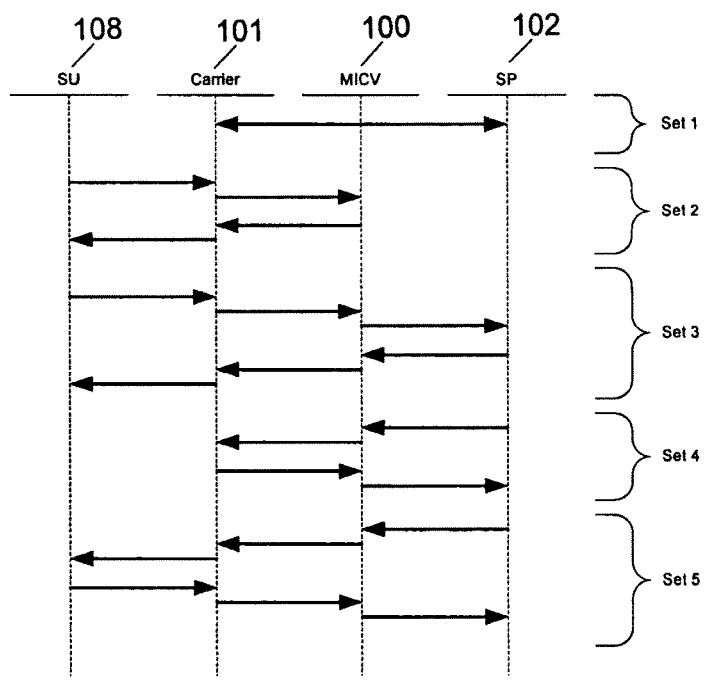
FIG. 4 illustrates various of the exchanges or interactions that are supported by aspects of the present invention.

The activities that are depicted under Set 1 of FIG. 4 represent the interactions that might take place between a SP and a WC in connection with a new campaign from or service offering by the SP. Various campaign or service offering configuration information may flow from the interactions. That information may result in various definitional entries being applied to a Db repository, through for example an interface (Web-based, etc.) or a data exchange, including, inter alia—SC, starting and ending date/time, participating WCs, opt-in rules (e.g., none, single, double, etc.) and opt-out rules (e.g., none, use of the 'STOP' keyword, etc.), billing events (e.g., are there per-use, one-time, recurring, etc. charges and if so what are the amounts of the charges), applicable keywords (such as for example 'START,' 'STOP,' 'ABOUT,' etc.) and the degree of allowed keyword misspelling, etc.

The activities that are depicted under Set 2 of FIG. 4 represent the interactions that might take place when a SU 108 sends a message (for the instant example assume an SMS message, but alternatively an MMS, etc. message) to a SC and, for any number of reasons, it is not possible to deliver the message—e.g., the SC is not available (e.g., no campaign or service offering has been defined for the SC), the SC is not active (e.g., the date/time of the receipt of the message is outside of the starting and ending date/time of a campaign or service offering for the SC), the SU 108 has not subscribed to the service/offering that is associated with the SC, the SU 108 has not completed an opt-in process that is defined as being required for the SC, etc.

In support of Set 2 a WorkFlow component might be defined that, inter alia, retrieves from a message the value or the content of the Destination Address field (for the instant example assume a SC, but alternatively a TN, etc.); confirms through a query to the Db repository that the SC (Destination Address) is not enabled because, e.g., it is not available, not active, that the SU has not completed a required opt-in process, etc.; and optionally returns to the SU 108 one or more response message(s) (for the instant example assume SMS message(s), but alternatively MMS, etc. message(s)).

The activities that are depicted under Set 3 of FIG. 4 represent the interactions that might take place when a SU 108 sends a message (for the instant example assume an SMS message, but alternatively an MMS, etc. message) to a SC (as used in the instant example, but alternatively a TN, etc.), the message is determined to be deliverable, the message is delivered to a SP, the SP optionally sends a message (for the instant example assume an SMS message, but alternatively an MMS, etc. message) to the SU 108, the message is determined to be deliverable, and the message is delivered to the SU 108.

In support of Set 3 a WorkFlow component might be defined that, inter alia, retrieves from a message the value or the content of the Source Address (for the instant example assume a TN, but alternatively any other message address identifier), the Destination Address (for the instant example assume a SC, but alternatively a TN, etc.), and the Body; performs the necessary and appropriate queries of the Db repository (to, for example, ascertain necessary message routing information); performs the necessary and appropriate inspections of the Body; completes the required processing of the contents of the Body (please see below); and as appropriate and as required delivers a message (either the original message or possibly a newly-constructed message) to the SP.

The processing of the contents of the Body that was described above may entail acting on a keyword that is present in the Body. Keywords that may be found in the Body might include, inter alia, START (e.g., a SU 108 wishes to subscribe), SUBSCRIBE (e.g., a SU 108 wishes to subscribe), STOP (e.g., a SU 108 wishes to unsubscribe), UNSUBSCRIBE (e.g., a SU 108 wishes to unsubscribe), ABOUT or INFO or HELP (e.g., a SU 108 wishes to obtain general information), PRICE (e.g., a SU wishes to obtain pricing information), etc. This catalog of keywords is illustrative only. It will be readily apparent to one of ordinary skill in the relevant art that other keyword actions, other keywords, etc. are easily possible.

A START or SUBSCRIBE keyword may, for example, trigger or launch one or more internal subscription activation activities. The activities may include, inter alia, an opt-in process (involving possibly the exchange of additional SMS, MMS, etc. messages with the SU 108; the direction of the SU 108 to a SP's Web site or to some other Web site; etc.) if, for example, the configuration of the SC so requires; if applicable, a price determination event (are there per-use, one-time, recurring, etc. charges and if so what are the amounts of the charges); if applicable, a billing operation; appropriate updates to the contents of a Db repository; the optional dispatch of one or more response messages; etc.

A billing operation may involve passing all of the collected billing information (SU, SC [campaign/service/etc.] details, price, payment mechanism, etc.) to a BI to complete a billing transaction.

The billing transaction may take any number of forms and may involve different external entities (e.g., a WC's billing system, a carrier billing system service bureau, a credit or debit card clearinghouse, etc.). The billing transaction may include, inter alia:

1) The appearance of a line item charge on the bill or statement that a SU receives from her WC. Exemplary mechanics and logistics associated with this approach are described in pending U.S. patent application Ser. No. 10/837, 695 entitled "SYSTEM AND METHOD FOR BILLING AUGMENTATION." Other ways of completing or performing line item billing are easily implemented by those skilled in the art.

2) The charging of a credit card or the debiting of a debit card. The particulars (e.g., number, expiration date) of the card that is to be used may, as one example, have been provided by a SU.

Following the successful completion of the billing transaction a message may be dispatched to the SP 102. The message may contain, possibly among other items, identifying information (e.g., source TN, source WC, the destination address [e.g., SC, TN, etc.]), as well as particulars of the completed billing transaction, etc.

A STOP or UNSUBSCRIBE keyword may, for example, trigger or launch one or more internal subscription cancellation or deactivation activities (with, inter alia, appropriate updates to the contents of a Db repository). Optionally a response message (for the instant example assume an SMS message, but alternatively an MMS, etc. message) may be dispatched to the SU.

An ABOUT, INFO, or HELP keyword may, for example, result in the return to the SU 108 one or more response message(s) (for the instant example assume SMS message(s), but alternatively MMS, etc. message(s)) containing, for example, descriptive or explanatory information.

A PRICE keyword may, for example, result in the return to the SU 108 of one or more response messages (for the instant example assume SMS message(s), but alternatively MMS, etc. message(s)) containing, for example, pricing information.

As noted above, the SP 102 may optionally send a message (for the instant example assume an SMS message, but alternatively an MMS, etc. message) to the SU. In support of this action the WorkFlow component might be defined to, inter alia, retrieve from a message the value or the content of the Source Address (for the instant example assume a SC, but alternatively a TN, etc.), the Destination Address (for the instant example assume a TN, but alternatively any other message address identifier), and the Body; perform the necessary and appropriate queries of the Db repository (to, for example, ascertain necessary message routing information); perform the necessary and appropriate inspections of the Body; complete the required processing of the contents of the Body (see generally above and below); and as appropriate and as required deliver a message (either the original message or possibly a newly-constructed message) to the SU 108.

The activities that are depicted under Set 4 of FIG. 4 represent the interactions that might take place when a SP sends a message (for the instant example assume an SMS message, but alternatively an MMS, etc. message) to a SU 108 and, for any number of reasons, it is not possible to deliver the message—e.g., the SU 108 has not subscribed, the SU 108 has not completed a required opt-in process, the message is identified as being spam, etc.

In support of Set 4 a WorkFlow component might be defined that, inter alia, retrieves from a message the value or the content of the Source Address (for the instant example assume a SC, but alternatively a TN, etc.), the Destination Address (for the instant example assume a TN, but alternatively any other message address identifier) and the Body; confirms through a query to the Db repository that the SC (Source Address) is not available or not active, confirms through a query to the Db repository that the SU (TN) has not completed a required opt-in process, identifies the Body of the message as containing spam, etc.; and optionally returns one or more response message(s) (for the instant example assume SMS message(s), but alternatively MMS, etc. message(s)) to the SP 102.

The determination that the Body of a message contains spam may result from the application of any number of processes or techniques including, inter alia, static measures (e.g., a search through a configurable list of static keywords), dynamic measures (e.g., heuristics and sliding windows), a combination of static and dynamic measures, etc. It will be readily apparent to one of ordinary skill in the relevant art that numerous other processes or techniques are also possible.

The activities that are depicted under Set 5 of FIG. 4 represent the interactions that might take place when a SP sends a message (for the instant example assume an SMS message, but alternatively an MMS, etc. message) to a SU 108, the message is determined to be deliverable, the message is delivered to the SU 108, the SU 108 optionally sends a message (for the instant example assume an SMS message, but alternatively an MMS, etc. message) to the SP 102, the message is determined to be deliverable, and the message is delivered to the SP 102.

In support of Set 5 a WorkFlow component might be defined that, inter alia, retrieves from a message the value or the content of the Source Address (for the instant example assume a SC, but alternatively a TN, etc.), the Destination Address (for the instant example assume a TN, but alternatively any other message address identifier), and the Body; performs the necessary and appropriate queries of the Db repository (to, for example, ascertain necessary message routing information); performs the necessary and appropriate inspections of the Body (see generally above); completes the required processing of the contents of the Body; and as appropriate and as required delivers a message (either the original message or possibly a newly-constructed message) to the SU 108.

As noted above, the SU 108 may optionally send a message (for the instant example assume an SMS message, but alternatively an MMS, etc. message) to the SP. In support of this action the WorkFlow component might be defined to, inter alia, retrieve from a message the value or the content of the Source Address (for the instant example assume a TN, but alternatively any other message address identifier), the Destination Address (for the instant example assume a SC, but alternatively a TN, etc.), and the Body; perform the necessary and appropriate queries of the Db repository (to, for example, ascertain necessary message routing information); performs the necessary and appropriate inspections of the Body (see generally above); complete the required processing of the contents of the Body; and as appropriate and as required deliver a message (either the original message or possibly a newly-constructed message) to the SP 102.

The discussion above centered around separate WorkFlow components for each of the different activities (Set 2, . . . Set 5). Given the many common elements of the different WorkFlows it will be readily apparent to one of ordinary skill in the relevant art that the individual WorkFlows could easily be combined or consolidated in any number of different ways.

The response message(s) that were described above may optionally contain an informational element—e.g., 'Sorry, that Short Code is not currently available' or 'You need to opt-in', etc. The informational element may be selected statically (e.g., all generated messages are injected with the same informational text), randomly (e.g., a generated message is injected with informational text that is randomly selected from a pool of available informational text), or location-based (i.e., a generated message is injected with informational text that is selected from a pool of available informational text based on the current physical location of the recipient of the message as derived from, as one example, a LBS facility).

The response message(s) may optionally contain advertising—e.g., textual material if an SMS model is being utilized, or multimedia (images of brand logos, sound, video snippets, etc.) material if an MMS model is being utilized. The advertising material may be selected statically (e.g., all generated messages are injected with the same advertising material), randomly (e.g., a generated message is injected with advertising material that is randomly selected from a pool of available material), or location-based (i.e., a generated message is injected with advertising material that is selected from a pool of available material based on the current physical location of the recipient of the message as derived from, as one example, a LBS facility).

The response message(s) may optionally contain promotional materials (e.g., still images, video clips, etc.).

A Db repository may be structured so that a profile (in general, a collection of related descriptive, definitional, etc. information) is maintained for one or more of each SU, WC, SC, and SP. At various points during the processing of messages (e.g., at a price determination point, as described above) the contents of one or more of the profiles may be examined so as to, among other things, arrive at a service/offering price using more complicated or involved algorithms, etc.

It is important to note that while aspects of the discussion that was presented above focused on the use of SCs, it will be readily apparent to one of ordinary skill in the relevant art that TNs and other message address identifiers are equally applicable and, indeed, are fully within the scope of the present invention.

The discussion that was just presented employed two specific wireless messaging paradigms—SMS and MMS. These paradigms potentially offer an incremental advantage over other paradigms in that native support for SMS and/or MMS is commonly found on the mobile telephone that a potential SU would be carrying. However, it is to be understood that it would be readily apparent to one of ordinary skill in the relevant art that other paradigms are fully within the scope of the present invention.

It is important to note that the hypothetical example that was presented above, which was described in the narrative and which was illustrated in the accompanying figures, is exemplary only. It will be readily apparent to one of ordinary skill in the relevant art that numerous alternatives to the presented example are easily possible and, indeed, are fully within the scope of the present invention.

The following list defines acronyms as used in this disclosure.

| Acronym | Meaning |
| --- | --- |
| AE | Administrative Engine |
| BI | Billing Interface |
| CSC | Common Short Code |
| DBMS | Database Management System |
| Db | Database |
| MICV | Messaging Inter-Carrier Vendor |
| LBS | Location Based Service |
| MDR | Message Detail Record |
| MH | Message Highway |
| MMS | Multimedia Message Service |
| MNP | Mobile Number Portability |
| MP | Message Processor |
| MPE | Message Processing Engine |
| ODBMS | Object Database Management System |
| Q | Queue |
| RDBMS | Relational Database Management System |
| Rx | Receiver |
| SC | Short Code |
| SM | Subscription Manager |
| SMS | Short Message Service |
| SP | Service Provider |
| SU | Service User |
| TN | Telephone Number |
| Tx | Transmitter |
| WC | Wireless Carrier |

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the relevant art in light of the above disclosure.

What is claimed is:

1. In a messaging intermediary, the messaging intermediary logically disposed between at least one wireless carrier and at least one service provider, a processor-based system on a server, the processor-based system comprising:
   a message highway that interconnects the at least one wireless carrier and the at least one service provider; and
   a plurality of message processors in communication with the message highway,
   wherein at least one of the message processors is a subscription manager that is configured to at least (a) manage short message service short codes on behalf of the at least one carrier and/or the at least one service provider and (b) operate on a message, the message being exchanged between the at least one wireless carrier and the at least one service provider, including at least identifying a keyword within a body of the message.

2. The processor-based system of claim 1, wherein the subscription manager is further configured to manage an opt in process for service users.

3. The processor-based system of claim 1, wherein the subscription manager is further configured to manage an opt out process for service users.

4. The processor-based system of claim 1, wherein the subscription manager is further configured to determine whether a destination number associated with a message sent by a service user and received from a wireless carrier is not enabled.

5. The processor-based system of claim 4, wherein destination number is a short message service short code.

6. The processor-based system of claim 4, wherein the destination number is not enabled because it is at least one of not available, not active, or an opt in process has not been completed.

7. The processor-based system of claim 1, wherein the keyword is one of start, stop, subscribe, unsubscribe, about, info, help, or price.

8. The processor-based system of claim 1, wherein the subscription manager is further configured to keep track of starting and ending dates and times for short message service (SMS) short codes and further configured to stop delivery of a given SMS message, addressed to a given SMS short code, to the at least one service provider when the given SMS short code is not active because a date and time at which the given SMS message is sent are outside of the starting and ending dates and times for the given short code.

9. The processor-based system of claim 1, wherein the subscription manager is further configured to keep track of respective wireless carriers' participation with respect to given short codes.

10. In a messaging intermediary, the messaging intermediary logically disposed between at least one wireless carrier and at least one service provider, a server-based method, the server-based method comprising:
   receiving at a short message service message processing engine a message being exchanged between the at least one wireless carrier and the at least one service provider;
   operating on the message including at least (a) identifying a keyword within a body of the message and (b) determining, based on a destination address of the message and a query to a database, whether the message may be delivered.

11. The server-based method of claim 10, further comprising managing an opt in process for service users.

12. The server-based method of claim 10, further comprising managing an opt out process for service users.

13. The server-based method of claim 10, further comprising determining whether a destination number associated with a message sent by a service user and received from a wireless carrier is not enabled.

14. The server-based method of claim 13, wherein destination number is a short message service short code.

15. The server-based method of claim 13, wherein the destination number is not enabled because it is at least one of not available, not active, or an opt in process has not been completed.

16. The server-based method of claim 10, wherein the keyword is one of start, stop, subscribe, unsubscribe, about, info, help, or price.

17. The server-based method of claim 10, further comprising keeping track of starting and ending dates and times for short message service (SMS) short codes and stopping delivery of a given SMS message, addressed to a given SMS short code, to the at least one service provider when the given SMS short code is not active because a date and time at which the given SMS message is sent are outside of the starting and ending dates and times for the given short code.

18. The sever-based system of claim 10, further comprising keeping track of respective wireless carriers' participation with respect to given short codes.

\* \* \* \* \*